(12) United States Patent
Sarh et al.

(10) Patent No.: US 8,950,054 B2
(45) Date of Patent: Feb. 10, 2015

(54) MANUFACTURING METHOD AND ROBOTIC ASSEMBLY SYSTEM

(71) Applicant: The Boeing Company, Seal Beach, CA (US)

(72) Inventors: Branko Sarh, Huntington Beach, CA (US); Harinder S. Oberoi, Snohomish, WA (US); Rodney S. Wright, Huntington Beach, CA (US); Jeffrey L. Miller, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/648,871

(22) Filed: Oct. 10, 2012

(65) Prior Publication Data

US 2014/0096365 A1 Apr. 10, 2014

(51) Int. Cl.
*B21J 15/02* (2006.01)
*B23P 11/00* (2006.01)
*B23P 19/00* (2006.01)
*B21J 15/32* (2006.01)
*B21J 15/14* (2006.01)
(Continued)

(52) U.S. Cl.
CPC .............. *B23P 19/001* (2013.01); *B21J 15/02* (2013.01); *B21J 15/32* (2013.01); *B21J 15/142* (2013.01); *B25B 11/002* (2013.01)
USPC ..................... 29/525.05; 29/897.2; 29/525.02; 29/525.03; 29/525.06; 29/243.54; 29/50; 29/810; 29/238; 335/289

(58) Field of Classification Search
CPC ........ B21J 15/04; B21J 15/041; B21J 15/043; B21J 15/046; B21J 15/06; B21J 15/142; B21J 15/28; B23P 19/04; B23P 23/04; B23Q 3/1543; B23Q 3/1546; B23Q 3/15506; B23Q 3/15513
USPC .................. 29/897.2, 525.02–525.07, 243.5, 29/243.53, 243.54, 39–47, 50, 56.6, 810, 29/238; 335/289
See application file for complete search history.

(56) References Cited

U.S. PATENT DOCUMENTS 6,357,101 B1 3/2002 Sarh et al.
6,536,100 B2 3/2003 Sarh et al.
(Continued)

FOREIGN PATENT DOCUMENTS

EP 1132164 12/2001

*Primary Examiner* — Alexander P Taousakis
*Assistant Examiner* — Matthew P Travers
(74) *Attorney, Agent, or Firm* — Joseph M. Rolnicki; Evans & Dixon, LLC (57) ABSTRACT

A manufacturing method employing a robotic assembly system includes first and second fastener system components that are positioned by a robotic assembly on opposite sides of at least two structural pieces that are to be fastened together. The first system component includes a particular tool of a plurality of different types of tools, where the particular tool installs a particular fastener of a plurality of different types of fasteners. Each tool includes a block or base of magnetic material with a passageway opening for the fastener associated with the tool passing through the base. The robotic assembly positions the tool against one side of the structural pieces to be fastened, and positions an electromagnet assembly on the opposite side of the structural pieces. Activating the electromagnet assembly clamps the structural pieces together. With the fastener positioned in a hole through the structural pieces, the tool is activated to install the fastener between the structural pieces.

13 Claims, 10 Drawing Sheets

(51) Int. Cl.
  *B25B 11/00* (2006.01)
  *B23P 19/04* (2006.01)

(56) References Cited

U.S. PATENT DOCUMENTS

| | | | |
|---|---|---|---|
| 6,905,291 B2 | 6/2005 | Day et al. | |
| 7,003,860 B2* | 2/2006 | Bloch et al. | 29/407.1 |
| 7,088,210 B2 | 8/2006 | Day et al. | |
| 7,148,776 B2 | 12/2006 | Day et al. | |
| 7,794,183 B2 | 9/2010 | Wright et al. | |
| 2006/0218780 A1* | 10/2006 | Lewis et al. | 29/798 |
| 2007/0288124 A1* | 12/2007 | Nagata et al. | 700/258 |
| 2008/0155807 A1* | 7/2008 | Toh et al. | 29/525.01 |
| 2008/0244888 A1 | 10/2008 | Sarh | |
| 2010/0071192 A1 | 3/2010 | Sarh et al. | |
| 2011/0018182 A1 | 1/2011 | Day et al. | |
| 2011/0245971 A1 | 10/2011 | Sarh et al. | |
| 2012/0011693 A1 | 1/2012 | Amirehteshami et al. | |
| 2012/0014759 A1 | 1/2012 | Sarh et al. | |

* cited by examiner

MANUFACTURING METHOD AND ROBOTIC ASSEMBLY SYSTEM

FIELD OF THE INVENTION

The present invention pertains to a method of manufacturing that involves a robotic assembly that selects and operates a particular tool in performing a fastener installation on a structure. More specifically, the invention pertains to a method of manufacturing that includes first and second fastener system components that are positioned by a robotic assembly on opposite sides of at least two structural pieces that are to be fastened together. The first system component includes a particular tool of a plurality of different types of tools, where the particular tool installs a particular fastener of a plurality of different types of fasteners. For example, the plurality of different types of tools could include a tool that installs rivets, a tool that installs HI-LOK type fasteners, a tool that installs lock bolts, etc. Each tool includes a block or base of magnetic material with a passageway opening for the fastener associated with the tool passing through the base. The robotic assembly attaches to a selected tool of the plurality of different tools that installs a desired fastener of the plurality of different fasteners. The robotic assembly then positions the tool against one side of the structural pieces to be fastened. The second system component includes an electromagnet that is activated to draw the first and second system components together on opposite sides of the two structural pieces, thereby clamping the two structural pieces together. With a fastener positioned in a hole through the structural pieces, the tool is activated to install the fastener between the structural pieces.

BACKGROUND

The current practice of securing two or more structural pieces together by one or more fasteners typically involves first clamping the pieces together with holes through the two pieces being aligned. Alternatively, the pieces can be clamped together and then holes can be formed through the pieces. A fastener, for example a rivet is then inserted through each of the holes with the rivet head positioned on one side of the structural pieces and the rivet tail projecting from the opposite side of the structural pieces. A bucking bar is typically manually positioned against the rivet tail while the rivet head is hammered by a rivet hammer. The force of the rivet hammer on the rivet head and the force of the bucking bar on the rivet tail causes the bucking bar to deform the rivet tail into a buck tail or shop head that secures the rivet in place in the rivet hole between the structural pieces and thereby rivets the structural pieces together.

Electromagnets have been employed in clamping two or more structural pieces together prior to their being secured together by fasteners. Current electromagnetic clamping technology typically employs an electromagnet as one clamping component and one or more steel plates as additional clamping components. The steel plate or plates have pluralities of holes that are positioned in the plates to correspond to fastener locations through the structural pieces. The steel plates are positioned on one side of the structural pieces and the electromagnet is positioned on the opposite side of the structural pieces. The electromagnet is then energized or activated, drawing the steel plates toward the electromagnet and clamping the structural pieces between the plates and the electromagnet. The holes through the steel plates enable fastener holes to be drilled through the clamped structural pieces and fasteners to be placed in the holes. Where the fasteners are rivets, a bucking bar is then manually inserted through the hole in the steel plate and against a tail of the rivet while the head of the rivet on the opposite side of the structural pieces is hammered by a rivet hammer, thereby forming the rivet tail into a shop head and securing the structural pieces together. This basic process is also performed when installing type fasteners or lock bolts in structural pieces.

This prior art electromagnetic clamping technology has the disadvantages of the need to position the steel plate or plates against one side of the structural pieces to be fastened together prior to the fastening process. It is often necessary to secure the steel plates against the one side of the structural pieces, for example by screws or clamps prior to fasteners being installed. The positioning and securing of the steel plates to the structural pieces to be joined is a time consuming process and an ergonomically demanding process especially when hundreds of these types of steel plates have to be pre-installed in order to fasten together structural pieces of a large structure, such as an aircraft.

SUMMARY OF THE INVENTION

The present invention overcomes the disadvantages associated with the positioning and securing of steel plates to structural pieces in electromagnetically clamping together the structural pieces prior to installing fasteners in the structural pieces. The present invention pertains to a method of manufacturing and tooling components employed in the method. The tooling components include a plurality of different tools, with each tool being associated with a particular type of fastener. For example, the plurality of different tools includes a tool for installing rivets, a tool for installing HI-LOK type fasteners, a tool for installing lock bolts, etc. Each tool has a base of magnetic material. The tooling components also include a robotic assembly system that is activated by instructions received from a design database to select a particular tool of the plurality of different tools to perform a desired fastening operation. The robotic system is activated to attach to a particular tool of the plurality of different tools that is associated with a particular fastener to perform the fastening operation. The robotic system moves the tool to a location on a first side of the first and second pieces of the structure to be connected. The tool base of magnetic material is positioned by the robotic system against the first side of the first and second pieces of the structure. An electromagnet is positioned on a second side of the first and second pieces of the structure, opposite the first side. The electromagnet is activated and attracts the base of the tool to the electromagnet, thereby clamping the first and second pieces of the structure between the base of the tool and the electromagnet. The tool is then operated to attach the fastener associated with the tool between the first and second pieces of the structure. The electromagnet is then deactivated and the robotic assembly system then moves the tool and the electromagnet to the next fastener installation location of the first and second pieces of the structure.

In one embodiment of the invention, the invention provides a rivet forming integral tool having a metallic block or base that can be robotically positioned on one side of two or more structural pieces to be riveted together, and then clamped to the pieces by the electromagnet that has been activated on the opposite side of the structural pieces. An opening passes through the base and is aligned with a rivet hole through the structural pieces when positioning the base.

The tool of this embodiment also includes a bucking bar assembly that is mounted on the base. The bucking bar assembly includes a bucking bar that is movable between first and second positions of the bucking bar relative to the base. In the first position the bucking bar is retracted into the bucking bar assembly and into the opening though the base. In the second position the bucking bar is moved through the bucking bar assembly and the base opening and into engagement with the tail of a rivet that has been positioned in the rivet hole aligned with the base opening.

The tool also includes a force controlling device that is operatively connected with the bucking bar assembly. The force controlling device is selectively controllable to supply fluid pressure to the bucking bar assembly to selectively move the bucking bar between its first and second positions. Additionally, with the bucking bar moved to its second position, the force controlling device is controllable to cause the bucking bar to exert a predetermined force on the tail of the rivet engaged by the bucking bar.

The tool also includes the electromagnet that is selectively energized to produce a magnetic field. The electromagnet has an opening passing therethrough and a rivet hammer is positioned in the opening. The rivet hammer is operable to reciprocate in the opening through the electromagnet.

In use of the rivet forming integral tool of the invention, the robotic assembly system is activated to select and attach to the tool. The robotic assembly system then moves the tool to a position where the base of the tool is positioned on one side of the structural pieces to be joined by a rivet and the electromagnet is positioned on the opposite side. The opening through the base is aligned with a rivet hole and the opening through the electromagnet is aligned with the same rivet hole. Alternatively, the rivet hole could be formed in the structural pieces in alignment with the base and electromagnet openings after the pieces are clamped together. The electromagnet is then energized to produce a magnet field that draws the base and the electromagnet together, clamping the structural pieces between the base and the electromagnet. A rivet to be secured to the structural pieces is positioned in the rivet hole.

The force controlling device of the tool is then controlled to supply fluid pressure to the bucking bar causing the bucking bar to move from its first position to its second position. In the second position the bucking bar exerts a pre-determined force on the tail of the rivet positioned through the hole in the structural pieces.

With the rivet forming integral tool clamped to one side of the structural pieces and the electromagnet clamped to the opposite side, the rivet hammer is activated to exert a hammering force on the rivet head. The bucking bar engaging the rivet tail forms a shop head from the rivet tail in response to the hammering force, thereby securing the rivet between the structural pieces and securing the structural pieces together.

With the rivet having been formed between the structural pieces, the electromagnet can then be deenergized, releasing the rivet forming integral tool from the structural pieces and enabling the tool to be moved by the robot assembly system to the next rivet hole/rivet location.

The features, functions, and advantages that have been discussed can be achieved independently in various embodiments or may be combined in yet other embodiments, further details of which can be seen with reference to the following description and drawings.

DESCRIPTION OF THE DRAWINGS

Further features of the rivet forming integral tool of the invention are set forth in the following detailed description of the tool and in the drawing figures.

DETAILED DESCRIPTION

Figure 1:
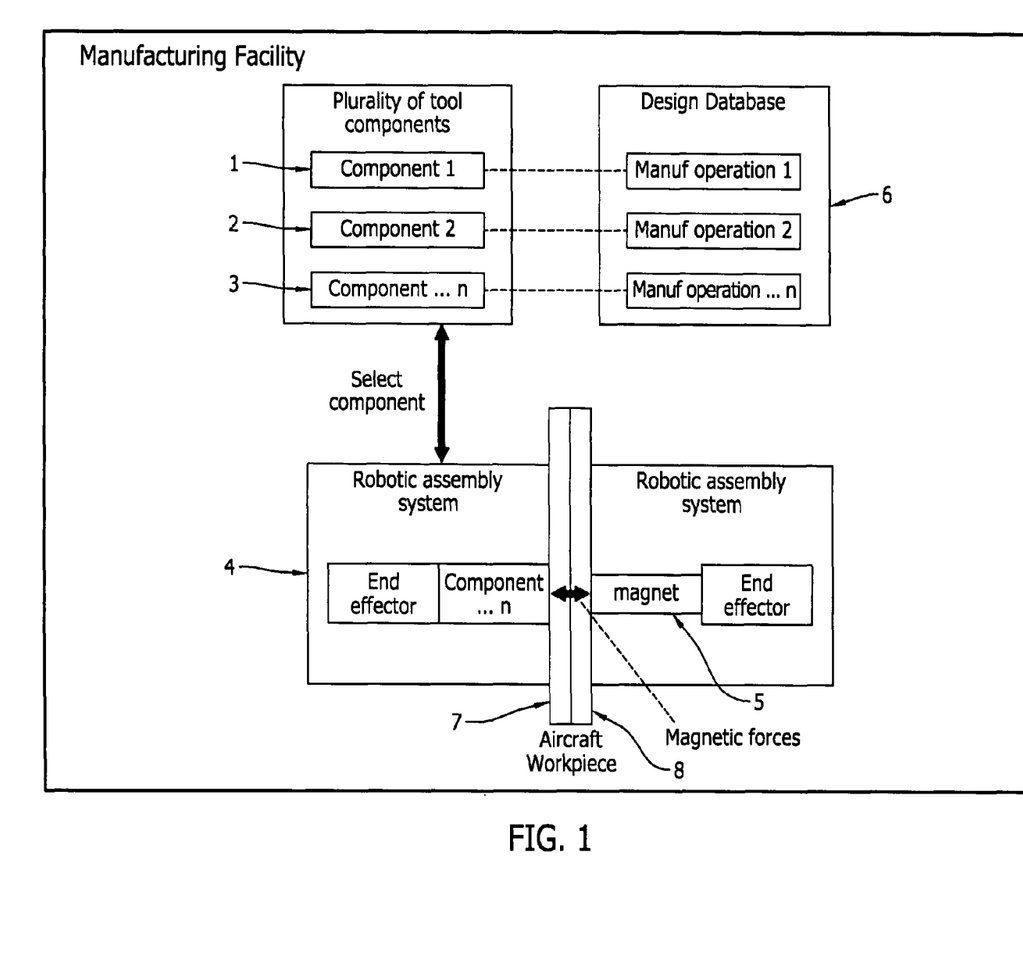
FIG. 1 is a schematic representation of tooling components and a robotic assembly system of the invention that perform the manufacturing method of the invention.

FIG. 1 is schematic representation of a manufacturing facility that employs the tooling components of the invention and the manufacturing method of the invention. In the example of FIG. 1, a plurality of different types of tooling components are employed to fasten together two or more structural pieces, for example fastening together sheet-metal pieces in forming a structural part of an aircraft. (This example is illustrative only and should not be interpreted as limiting). There are a variety of different types of tools, each having a particular type of fastener associated with the tool that could be employed to fasten together the structural pieces. The example of FIG. 1 represents three or more such tools maintained in the manufacturing facility. A plurality of different types of fasteners, each associated with one of the tools would also be maintained at the facility. For example, one tool 1 of the plurality of different tools could be used in installing or fastening a rivet type fastener between two or ore structural pieces. A second tool 2 of the plurality of different tools could be used in installing or fastening a HI-LOK® type fastener between two or more structural pieces. (Hi-LOK® is a registered trademark of the high HI-Shear Corporation of Torrance Calif.). A third tool 3 of the plurality of different tools could be used in installing or fastening a lock bolt type fastener between two or more structural pieces. The tools described above are only some examples of the many different types of tools that could be employed in the invention in performing the manufacturing method of the invention.

The tooling components of the invention may also include a robotic assembly system 4. The robotic assembly system 4 may have a conventional construction with at least one robotic arm of the system having an end effector that is attachable to a selected one of the plurality of different tools. Another robotic arm is secured to and moves an electromagnet assembly 5. The robotic assembly system 4 may also include a design data base 6 that is programmed with information that controls the movement of the robotic assembly system 4 and its arms in response to commands input into the database 6. The programmed information also instructs the robotic assembly system 4 to perform a particular fastening operation in fastening together pieces of a structure. For example, the design data base may provide instructions to the robotic assembly system 4 to select the rivet installation tool 1 and then move the rivet installation tool 1 to a particular location relative to first 7 and second 8 adjacent structural pieces where a rivet is to be installed. Additionally, the design database 6 may include instructions for the robotic assembly system 4 to then move from a location of the first 7 and second 8 structural pieces where a rivet has been installed, to a further location of the first 7 and second 8 structural pieces where a second rivet is to be installed. As should be apparent, the design database 6 may also include instructions for the robotic assembly system 4 to return the rivet tool 1 to its area where it is maintained, and select a further tool, for example the HI-LOK® tool 2 to perform a HI-LOK® type fastener installation at a further location of the first 7 and second 8 structural pieces.

Each of the plurality of different tools 1, 2, 3 is provided with a base of a magnetic material, an example of which will be described further. The base of the tool selected by the robotic assembly system 4 is positioned by the robotic assembly system against a first side of the first 7 and second 8 pieces of the structure. The electromagnet assembly 5 is also moved by the robotic assembly system 4 to a position on a second side of the first 7 and second 8 structural pieces opposite the tool. The design database 6 then controls the electromagnet assembly 5 to activate the electromagnet and attract the base of the tool to the electromagnet. This clamps the first 7 and second 8 pieces of the structure together between the base of the selected tool and the electromagnet. The design database 6 then operates the tool 1 to attach the fastener associated with the tool, i.e. a rivet between the first 7 and second 8 pieces of the structure. The design data base 6 then controls the robotic assembly system 4 to deactivate the electromagnet 5, thereby releasing the electromagnet and the tool 1 from the opposite sides of the fastened structure. The database 6 then controls the robotic assembly system 4 to move the tool 1 and the electromagnet 5 to a further location on the opposite sides of the first 7 and second 8 pieces of the structure to install a further fastener at that further location.

As stated earlier, the invention is intended to employ a plurality of different tools that are each associated with a different fastener to secure together two or more pieces of a structure employing a single type of fastener, or several different types of fasteners.

In one of the embodiments of the invention represented in FIGS. 2-5, the invention provides a rivet forming integral tool having a metallic block or base. The tool base is robotically positioned on one side of two or more structural pieces to be riveted together, and then clamped to the pieces by the electromagnet that has been activated on the opposite side of the structure pieces.

Figure 2:
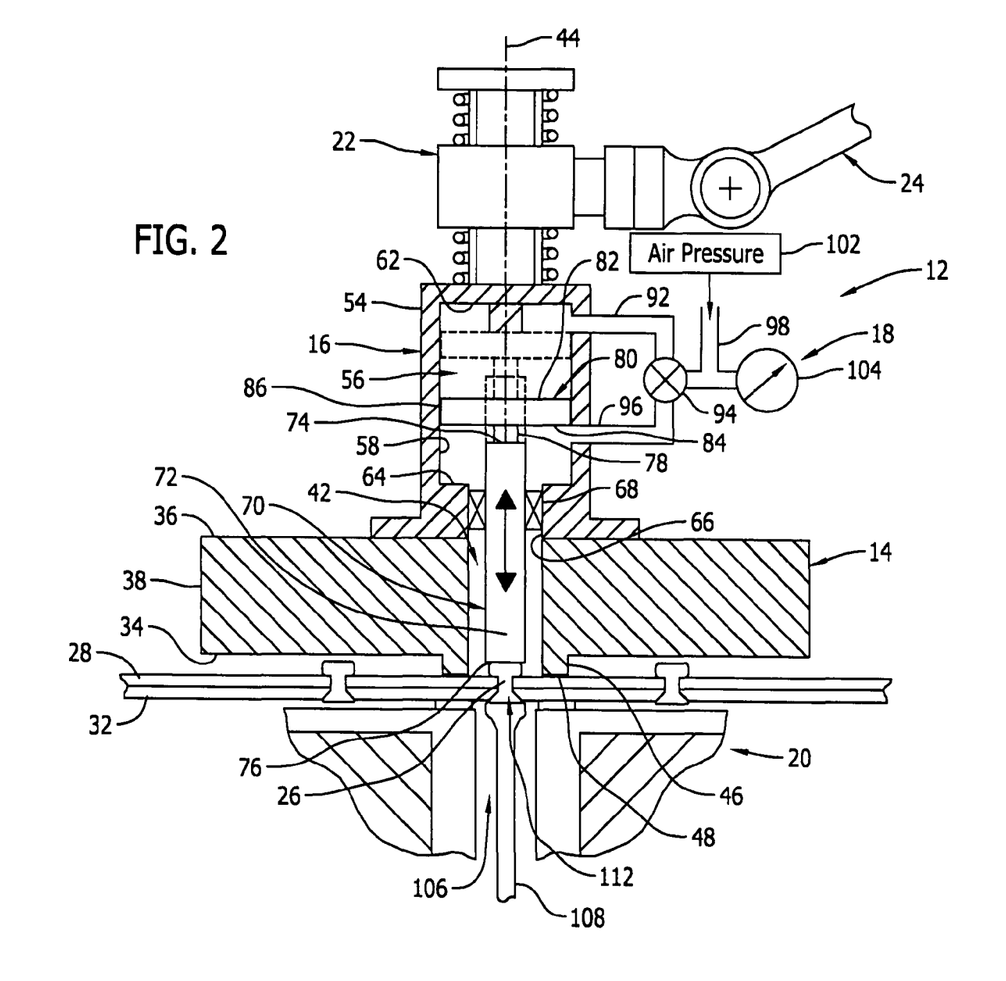
FIG. 2 is a side elevation view partially in section, illustrating an advantageous embodiment of a rivet forming integral tool of the invention being used in an operative environment of the tool.

FIG. 2 is a side elevation view, partially in section, of the rivet forming integral tool 12. The tool may be comprised of a base 14, a bucking bar assembly 16, a force controlling device 18, and an electromagnet assembly 20. The base 14, bucking bar assembly 16 and force controlling device 18 make up one riveting system component of the tool 12. The electromagnet assembly 20 having a riveting hammer 108 make up a second riveting system component of the tool. Additionally, the tool 12 is provided with a compliance unit 22 that operatively connects the tool to a robotic arm 24 where the robotic arm 24 moves the tool. However, it is not necessary that the tool 12 be used in combination with the compliance unit 22 and the robotic arm 24. As will be described herein, the tool 12 is designed primarily for use in forming rivets 26 between two or more structural pieces 28, 32, for example sheet metal pieces, to join the pieces together. In view of this intended use, the component parts of the tool 12 to be described are primarily constructed of metals or metallic materials to provide the parts with sufficient structural strength for their intended use. However, other equivalent materials could be employed in constructing the component parts of the tool 12.

Figure 3:
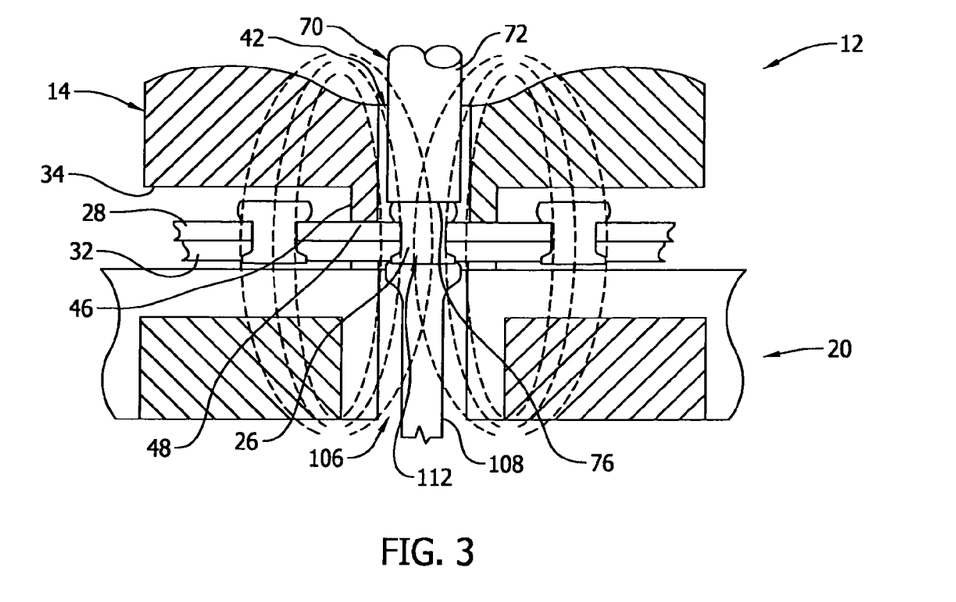
FIG. 3 is an enlarged partial view of the tool of FIG. 1.

The base 14 is magnetic and is preferably constructed of a magnetic material such as steel. In other embodiments of the base 14 it could be constructed as an electromagnet. The base 14 in the illustrative embodiment may be constructed as a solid steel block having opposite front 34 and rear 36 surfaces. The front 34 and rear 36 surfaces in the embodiment shown are flat, parallel surfaces that are spaced from each other by a width dimension of the base. At least one peripheral surface 38 extends around the base and between the front 34 and rear 36 surfaces. The peripheral surface 38 gives the base its width dimension. As shown in FIG. 3, in the embodiment of the tool 12 shown in the drawing figures, the base peripheral surface 38 has a rectangular configuration. Other configurations could be employed.

Figure 4:
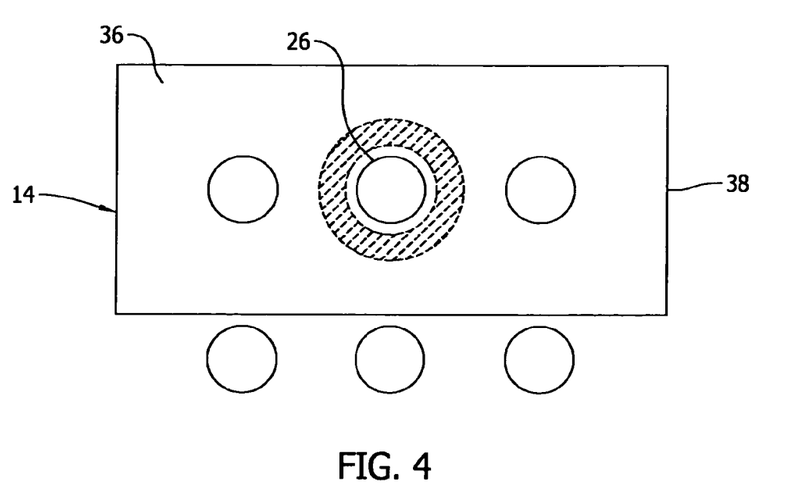
FIG. 4 is a top plan view of the base of the tool shown in FIG. 1.

A hole or opening 42 extends through the width of the base 14 and through the base front 34 and rear 36 surfaces. In the embodiment shown in FIGS. 2-4 the opening 42 is cylindrical and has a center axis 44 that defines mutually perpendicular axial and radial directions relative to the tool 12. The axis 44 is perpendicular to the base front 34 and rear 36 surfaces. As shown in FIG. 4, additional holes may be provided on opposite sides of the opening 42 to provide clearance to adjacent fasteners beneath the base 14.

A spacing protrusion 46 projects axially outwardly from the base front surface 34. The protrusion 46 is positioned on the base front surface 34 adjacent the base opening 42. In the illustrative embodiment the protrusion 46 has a cylindrical shape that surrounds the base opening 42. The protrusion 46 projects from the base front surface 34 to an annular engagement surface 48 that is parallel with the base front 34 and rear 36 surfaces. The axial length that the protrusion 46 projects from the base front surface 34 defines a clearance dimension that is larger than the length of a typical rivet tail. In the illustrative embodiment both the protrusion 46 and engagement surface 48 extend completely around the base opening 42. In other embodiments the protrusion 46 can be separated into separate protrusions that are spatially arranged around the base opening 42 and it is not necessary that the protrusion 46 be cylindrical and that the engagement surface 48 be annular.

The bucking bar assembly 16 may be operatively connected to the base 14. In the illustrative embodiment the bucking bar assembly 16 is mounted directly to the base rear surface 36. Other operative connections between the bucking bar assembly 16 and the base 14 could be employed. The bucking bar assembly 16 is symmetric around the base opening axis 44 and includes a cylindrical housing 54 having a hollow interior volume 56. The interior volume 56 of the housing is surrounded by a large cylindrical interior wall 58 that is coaxial with the base opening axis 44. The housing may also include a circular first end surface 62 at one end of the housing interior volume and an annular second end surface 64 at the opposite end of the housing interior volume. A small cylindrical interior wall 66 surrounds an opening that extends through the center of the housing second end surface 64 and exits the bottom of the housing 54 as shown in FIG. 1. The opening defined by the small cylindrical interior wall 66 may be aligned and coaxial with the opening 42 through the base 14. An annular bearing assembly 68 is mounted in the small cylindrical interior wall 66.

A bucking bar 70 is mounted in the bearing assembly 68 for reciprocating movements of the bucking bar relative to the bucking bar assembly housing 54 and the base 14. The bucking bar has a cylindrical exterior surface 72 with a center axis that is coaxial with the axis 44 of the base opening 42. The axial length of the bucking bar 70 extends between an annular first end surface 74 of the bar and a circular second end surface 76 of the bar. A small cylindrical stub shaft 78 extends axially from the bar first end surface 74. A cylindrical piston 80 is mounted on the distal end of the stub shaft. The piston 80 has a first circular end surface 82 and a axially opposite second annular end surface 84. A cylindrical side surface 86 extends between the piston first 82 and second 84 end surfaces. The piston side surface 86 engages in sliding engagement with the interior wall 58 of the bucking bar assembly housing 54. The piston 80 is axially moveable in the bucking bar assembly housing 54 between a first position of the piston shown in dashed lines in FIG. 1 and a second position of the piston shown in solid lines in FIG. 1. With the piston being operatively connected to the bucking bar 70 by the stub shaft 78, the reciprocating movements of the piston 80 between its first and second positions in the bucking bar assembly housing 54 result in the reciprocating movements of the bucking bar 70 between a first position of the bucking bar shown in dashed lines in FIG. 1 and a second position of the bucking bar shown in solid lines in FIG. 1.

The force controlling device 18 may be operatively connected with the bucking bar assembly 16. The force controlling device 18 may include a first fluid conduit 92 that communicates through the bucking bar assembly housing 54 with a first portion of the housing interior volume between the piston first end surface 82 and the housing first end surface 62. The opposite end of the first conduit 92 is connected to and in fluid communication with a control device such as a manually or automatically controlled valve 94. The force controlling device 18 may also include a second conduit 96 that communicates through the bucking bar assembly housing 54 with a second portion of the housing interior volume between the piston second end surface 84 and the housing second end surface 64. The opposite end of the second conduit 96 is connected to and in fluid communication with the control device 94. The control device 94 communicates through a third fluid conduit 98 with a separate, adjustable source of fluid pressure 102. A gauge 104 communicates with the third conduit 98 and provides a visual indication of the fluid pressure in the conduit. In the illustrative embodiment the control device 94 is a two position valve that communicates the source of fluid pressure 102 with either the first fluid conduit 94 while exhausting or venting the second fluid conduit 96, or communicates the source of fluid pressure 102 with the second fluid conduit 96 while exhausting or venting the first fluid conduit 92. Operating the control device 94 to communicate the source of fluid pressure 102 with the first fluid conduit 92 also communicates the fluid pressure with the piston first end surface 82 causing the piston and the bucking bar to move to their second positions shown in solid lines in FIG. 1. Operating the control device 94 to communicate the source of fluid pressure 102 with the second fluid conduit 96 also communicates the fluid pressure with the piston second end surface 84 causing the piston and the bucking bar to move to their first positions shown in dashed lines in FIG. 1.

The tool is connected by the compliance unit 22 with a robotic arm 24 of the earlier described robotic assembly system 4. The compliance unit 22 is spring biased on opposite sides of its connection to the robot bar 24, thereby providing a cushioned connection of the tool 12 with the robotic arm 24.

The electromagnet assembly 20 may be a conventional assembly used in clamping two structural pieces together in performing a riveting operation such as the assembly 5 described earlier. The electromagnet assembly 20 has an opening 106 through the assembly that provides access for a hammer 108 of a conventional rivet hammer.

Figure 5:
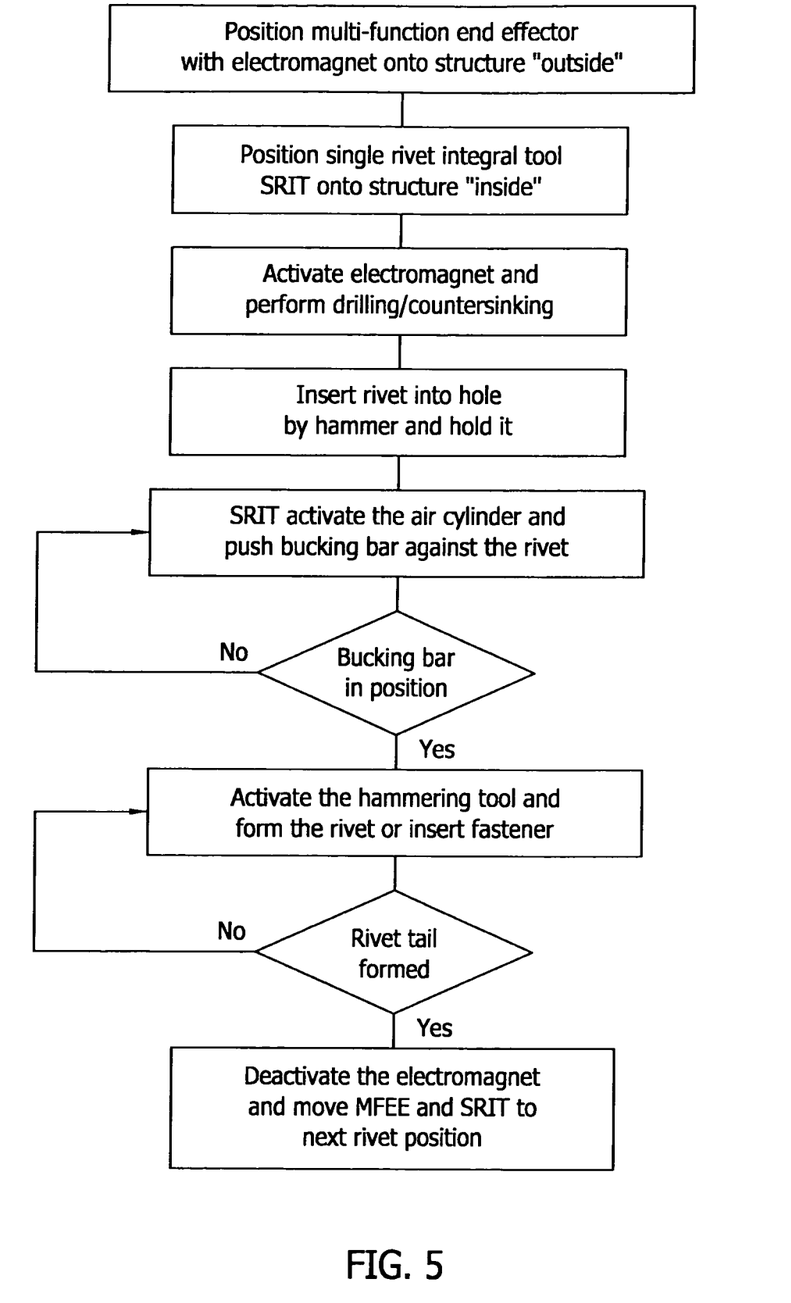
FIG. 5 is a flow-chart of the method of operation of the tool of FIG. 1.

The method of using the tool 12 in installing a rivet 26 between structural pieces 28, 32 is represented in FIGS. 1, 3 and 5. In the example shown there are two structural pieces. However, other numbers of structural pieces can be connected by using the tool 12 of the invention. According to the method, the electromagnet assembly 20 is positioned on one side of the structural pieces 28, 32. With the electromagnet assembly 20 positioned, the tool 12 of the invention is positioned on the opposite side of the structural pieces. The tool 12 is generally positioned so that the opening 42 through the base 14 of the tool is aligned with and coaxial with the opening 106 through the electromagnet assembly 20. The electromagnet assembly 20 is then activated or energized, creating a magnetic field as represented in FIG. 2. The magnetic field draws the electromagnet assembly 20 and the base 14 of the tool 12 together, clamping the structural pieces 28, 32 between the electromagnet assembly 20 and the tool 12.

With the structural pieces 28, 32 clamped between the electromagnet assembly 20 and the tool 12, a rivet hole 112 can then be formed through the structural pieces 28, 32. The rivet hole 112 is aligned coaxially with the center axis 44 of the base opening 42 and with the opening 106 through the electromagnet assembly 20. In other methods of using the tool 12 of the invention, the rivet hole 112 could be previously formed through the structural pieces 28, 32 prior to their being clamped together by the electromagnet assembly 20 and the tool 12.

Following the formation of the rivet hole 112, a rivet 26 is positioned in the hole. The head of the rivet is positioned toward the electromagnet assembly 20 and the tail of the rivet is positioned toward the tool 12. The rivet 26 can be positioned in the hole by the hammer 108 of a rivet hammer and then held in place by the hammer.

With the rivet hammer 108 positioned against the head of the rivet 26 holding the rivet in the rivet hole 112, the force controlling device 18 of the tool 12 is then activated to communicate fluid pressure, preferably air pressure to the control device valve 94. The control device valve 94 is then operated to communicate the source of fluid pressure 102 with the first fluid conduit 92. This in turn communicates the source of fluid pressure 102 with a first portion of the bucking bar assembly housing 54 interior volume between the housing first end surface 62 and the bucking bar piston first end surface 82. This operation of the control device valve 94 also vents the portion of the housing interior volume between the housing second end surface 64 and the bucking bar piston second end surface 84. The fluid pressure being supplied to the bucking bar assembly housing 54 moves the piston 80 and the bucking bar 70 to their second positions shown in solid lines in FIG. 1. This causes the bucking bar second end surface 76 to engage against the tail of the rivet 26. The bucking bar second end surface 76 engages with a pre-determined force against the tail of the rivet 26 that is determined by adjusting the fluid pressure supplied by the source of fluid pressure 102. With the bucking bar second end surface 76 engaged against the tail of the rivet 26, the rivet hammer 108 can then be activated to hammer the rivet 26 and form the tail of the rivet 26 into a buck tail or shop head that in turn secures the structural pieces 28, 32 together. The pre-determined force of engagement of the bucking bar second end 76 with the tail of the rivet 26 enables the tool 12 to form buck tails or shop heads having consistent dimensions.

With the rivet forming operation completed, the control device valve 94 is then operated to communicate the source of fluid pressure 102 with the second fluid conduit 96. This in turn communicates the fluid pressure with the portion of the bucking bar assembly interior volume 56 between the housing second end surface 64 and the bucking bar piston second end surface 84, while exhausting the portion of the interior volume between the housing first end surface 62 and the piston first end surface 82. This causes the piston 80 and the bucking bar 70 to move to their first positions shown in dashed lines in FIG. 1, disengaging the bucking bar second end surface 76 from the rivet 26. The tool 12 can then be moved to a further rivet location.

As can be seen in FIGS. 1 and 2, the clearance dimension of the protrusion 46 projecting from the base front surface 34 spaces the front surface 34 outwardly from rivet tails formed in rivets in the structural pieces 28, 32. This enables the base 14 and in particular the base front surface 34 to pass over previously formed buck tails or shop heads when moving the tool 12 to the next riveting location.

As explained earlier, the tool 12 is provided with a compliance unit 22 connecting the tool to a robotic arm 24 that moves the tool 12 to its next location.

Figure 6A:
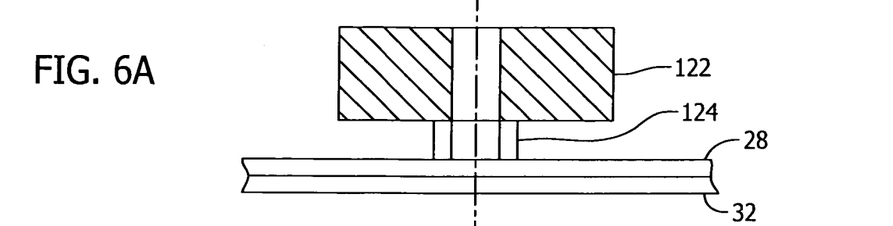
FIGS. 6A, 6B and 6C are views of a base of a tooling component used to install HI-LOK type fasteners.
Figure 6B:
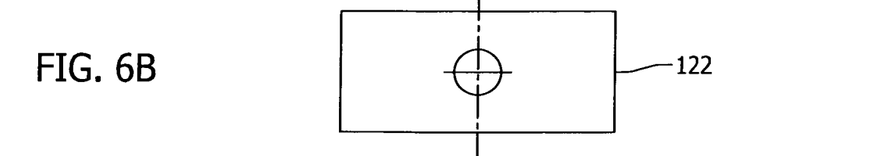
Figure 6C:
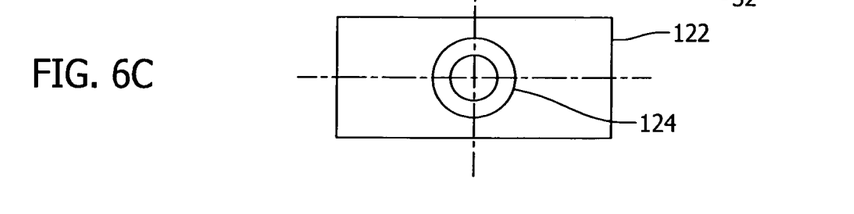

The shape, geometry and volume of the base of each component tool of the invention is designed depending on the amount of clamping force needed between the two structural pieces to be fastened together and on the accessibility of fastener locations for the two structural pieces. FIG. 6a is a cross-section view of a representation of a base 122 employed on a tool that installs HI-LOK type fasteners. FIG. 6b is a top plan view of the base 122 of FIG. 6a and FIG. 6c is a bottom plan view of the base 122 of FIG. 6A. The base 122 is constructed in substantially the same manner as that of the tooling component shown in FIG. 2, but the protrusion 124 on the under side of the base is dimensioned to provide a clearance dimension beneath the base that is larger than the length of a typical HI-LOK type fastener. The protrusion 124 is dimensioned to enable the floating movement of the base 122 over and above the HI-LOK type fasteners inserted through the two structural pieces 28, 32. Because the distance between the electromagnet beneath the structural pieces 28, 32 and the base 122 above the structural pieces is larger than the distance between the electromagnet and base shown in FIG. 2, the size and volume of the base 122, and/or the electric current supplied to the electromagnet has to be adjusted to achieve the required clamping force between the electromagnet and the base 122.

Figures 7A, 7B:
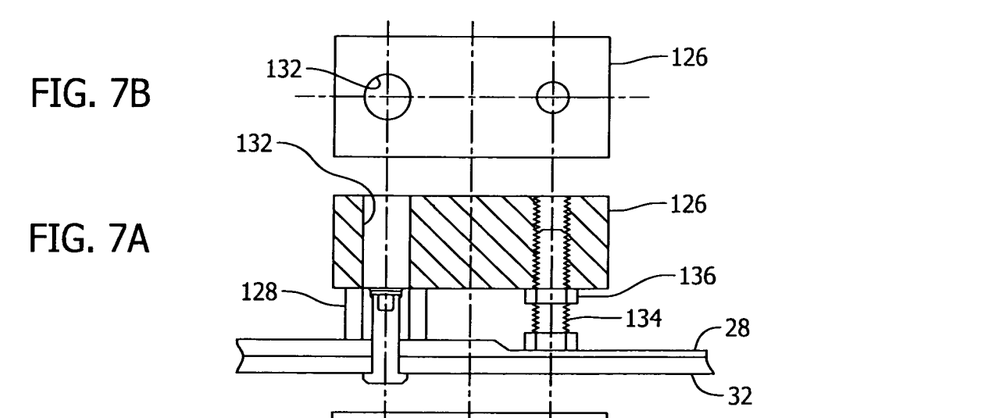
FIGS. 7A, 7B and 7C are views of an asymmetrical base of a tool used to install HI-LOK type fasteners.
Figure 7C:
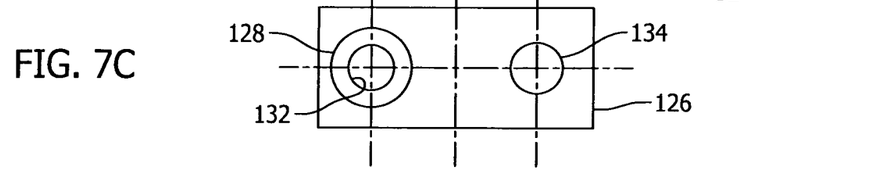

FIGS. 7a, 7b, and 7c show a representation of an asymmetrical base 126 of a tooling component that is used to install HI-LOK type fasteners in fastener locations that are difficult to access. As best seen in FIGS. 7b and 7c, the base protrusion 128 and the opening 132 through the base are offset and are not located in the center of the base 126. Therefore, the base 126 has to be supported on an opposite side of the base from the protrusion 128. The base 126 is therefore provided with an adjustable post or screw 134 that is adjustably screw threaded into an internally screw threaded hole through the base 126. A nut 136 is screw threaded on the screw 134 to hold the screw in its adjusted position in the base 126. The screw 134 compensates for overturning moment forces created by activating the electromagnet due to the asymmetrical positioning of the protrusion 128 on the base 126. Basically, the protrusion 128 and the screw 134 maintain the desired normality of the opening 132 through the base 126 relative to the two structural pieces 28, 30. As shown in FIG. 7a, the screw 134 can also be height adjusted to compensate for structural thickness variations in the two structural pieces.

Figure 8A:
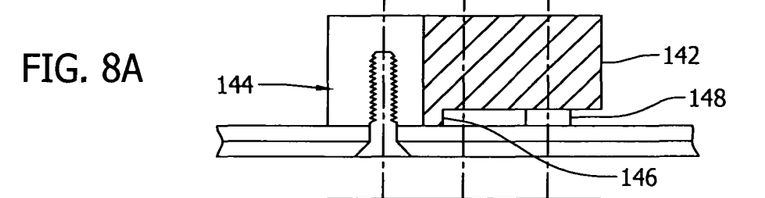
FIGS. 8A, 8B and 8C are views of an asymmetrical base of a tool used to install lock bolts.
Figure 8B:
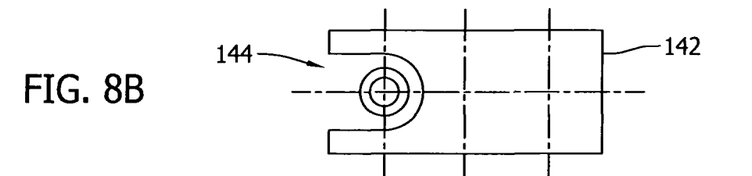
Figure 8C:
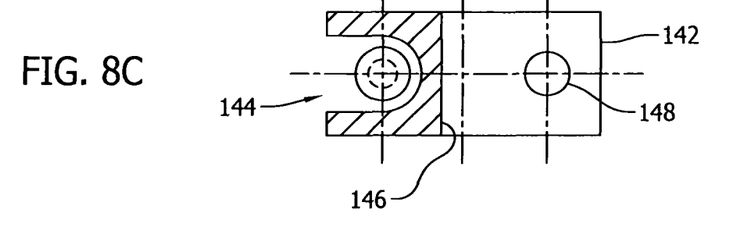

FIGS. 8a, 8b and 8c show a further embodiment of the base 142 of the invention. The base 142 shown in FIGS. 8a, 8b and 8c, has an asymmetrical construction for use on a tooling component that installs lock bolts in difficult to reach locations. Because the typical lock bolt has a relatively long shaft in comparison to a HI-LOK type fastener or to a rivet tail, the use of a long protrusion on the underside of the base 142 would move the base further away from the electromagnet positioned on the opposite side of the structural pieces. This would require significantly increasing the size and volume of the base 142 and also increasing the current amperage supplied to the electromagnet to provide a sufficient clamping force between the base and the electromagnet. Therefore, instead of employing a long protrusion on the base 142, the base is provided with a U shaped cutout 144 in one side of the base and a short U-shaped protrusion 146 beneath the base and around the cutout. The cutout 144 enables the base 142 to be positioned around the lock bolt and in close proximity to the electromagnet positioned on the opposite side of the structural pieces from the base. A cylindrical foot 148 projects from the bottom of the base 142 on an opposite side of the base from the U-shaped protrusion 146. As with the previously described screw 134, the foot 148 prevents the base 142 from being rotated by moment forces exerted on the base by the electromagnet activation.

Figure 9:
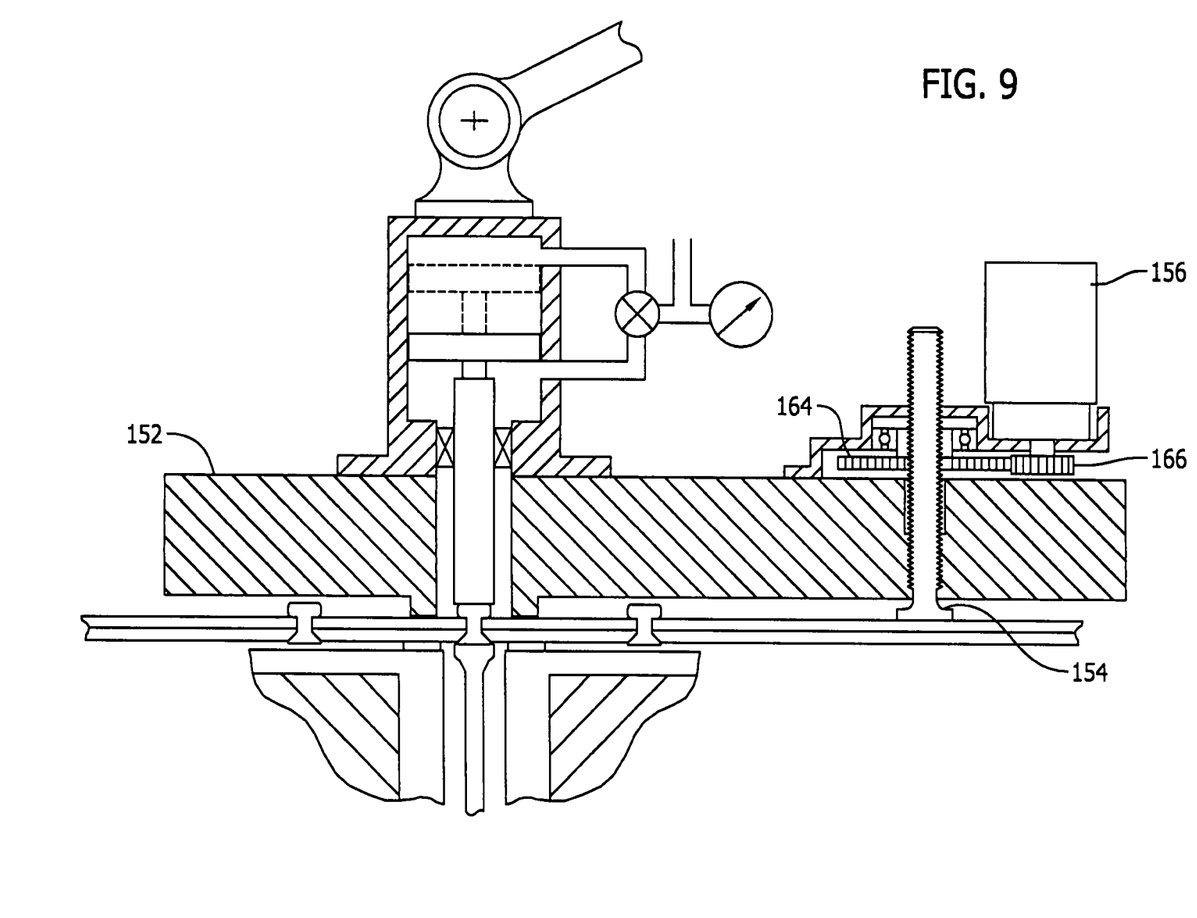
FIG. 9 is a cross-section view of a tool similar to that shown in FIG. 2 with the tool having an asymmetrical base including a motorized normality adjustment device.
Figure 10:
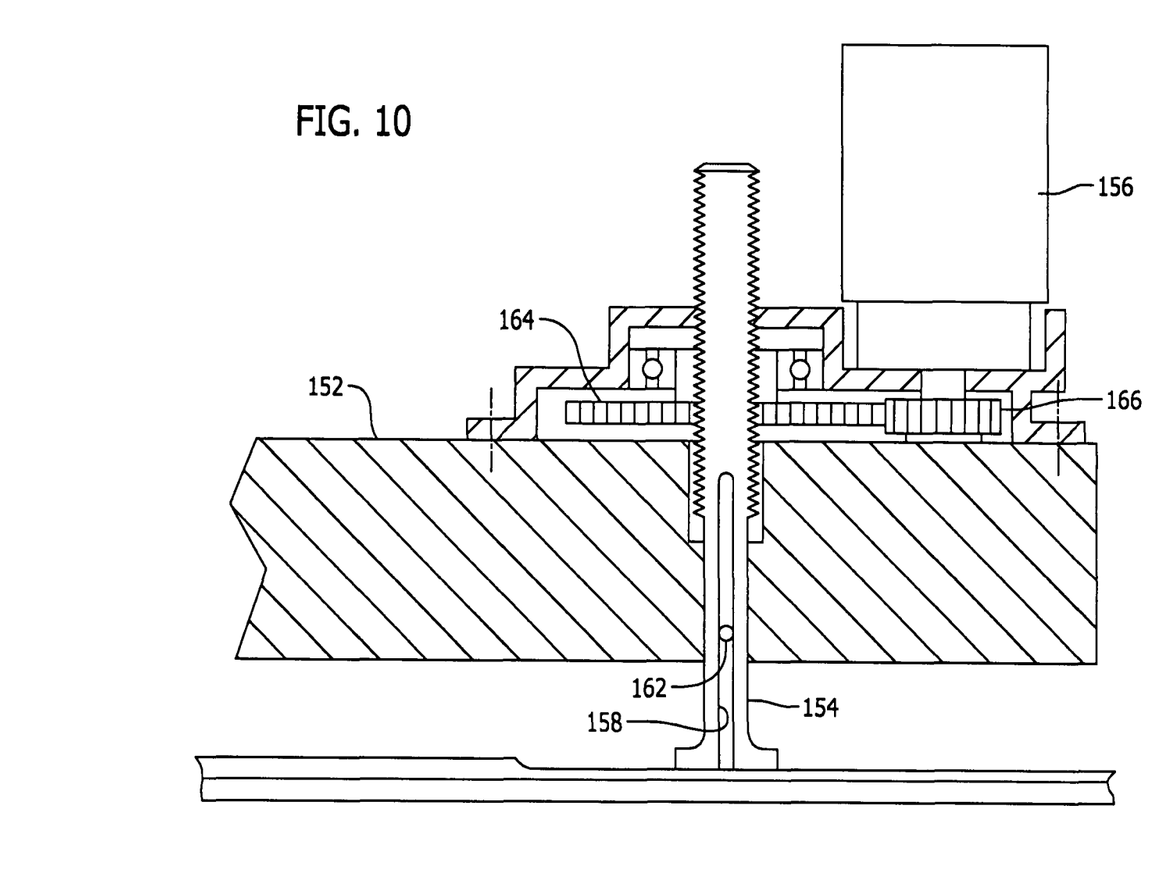
FIG. 10 is an enlarged view of the motorized normality adjustment device of FIG. 9.

FIG. 9 shows an embodiment of a rivet forming tool similar to that of FIG. 2, but including an asymmetrical base 152. In addition, the embodiment of the tool shown in FIG. 9 includes an adjustment post 154 for adjusting the normality of the base 152 relative to the two structural pieces, where the position of the post beneath the base is adjusted by an electric motor 156. An enlarged view of the adjustment device is shown in FIG. 10. The post 154 is mounted for sliding movement through a hole in the base 152 and may be adjustably positioned in the hole to compensate for the moment force exerted on the base 152 by the electromagnet activated on the opposite side of the structural pieces. The post has a groove 158 through a portion of its length. A pin 162 extends transversely through the hole in the base 152 and extends through the groove 158 of the post. The pin 162 prevents the post 154 from rotating, but allows the sliding movement of the post through the hole in the base 152. The post 154 is driven through the base 152 by a driven gear 164 screw threaded on the post 154 and a drive gear 166 mounted on the output shaft of the motor 156. It can be seen that the motor driving the drive gear 166 in opposite directions of rotation will impart rotation to the driven gear 164 which is screw threaded on the post 154. The rotation of the driven gear 164 will thereby move the post 154 through the hole in the base 152 while the pin 162 prevents rotation of the post 154.

Figure 11:
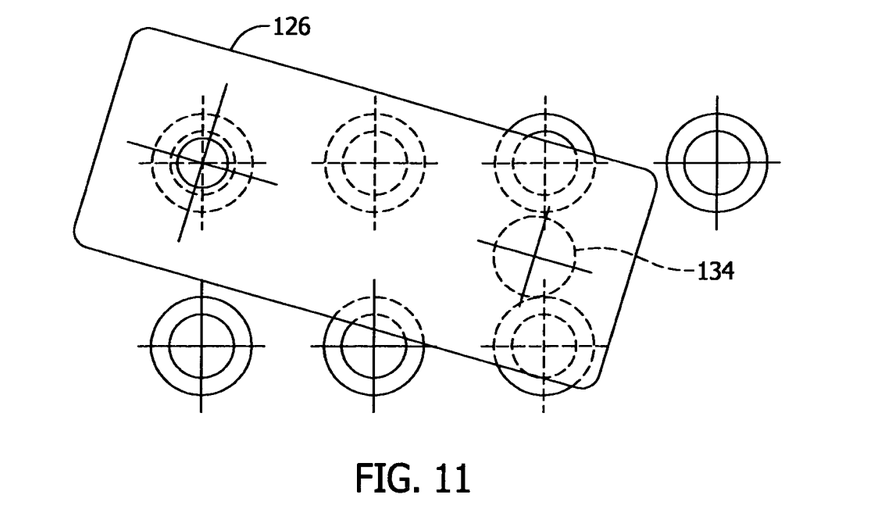
FIG. 11 is a plan view of the base shown in FIG. 7a showing positioning of the base relative to rivets or HI-LOK type fasteners.

FIG. 11 is a plan view of the base 126 of FIG. 7a representing the process of positioning or orienting the asymmetrical base 126 relative to previously installed rivets or HI-LOK type fasteners. As shown in FIG. 11, the base 126 is oriented relative to the rivets or HI-LOK type fasteners where the adjustment screw 134 in the bottom of the base 126 is positioned between adjacent fasteners.

Figure 12:
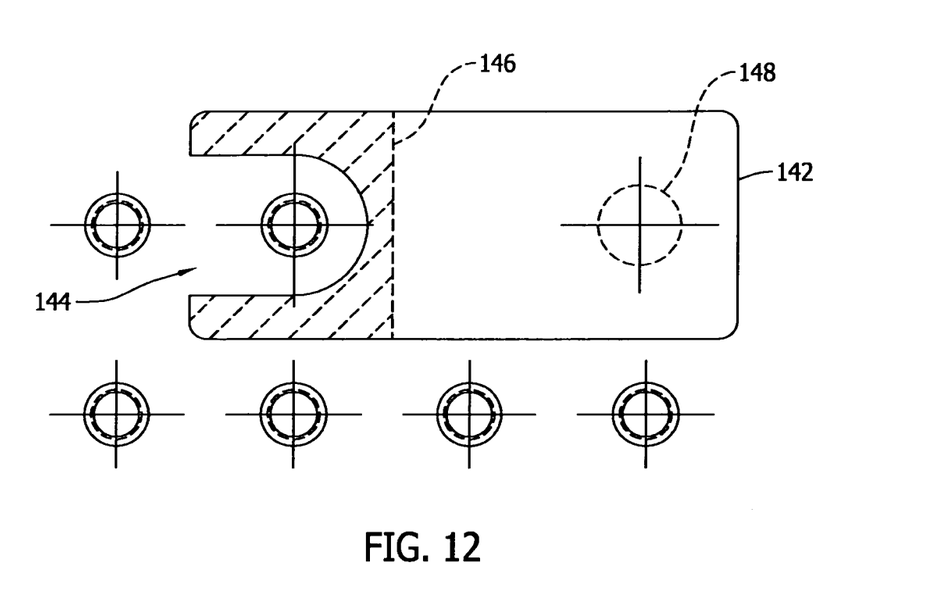
FIG. 12 is a plan view of the base shown in FIG. 8a showing the positioning of the base relative to lock bolt fasteners.

FIG. 12 is a plan view of the base 142 of FIG. 8a representing the process of positioning or orienting the base 142 relative to previously installed lock bolts. As shown in FIG. 12, the base 142 is positioned to install lock bolts in a sequence, where the base avoids previously installed lock bolts.

Figure 13:
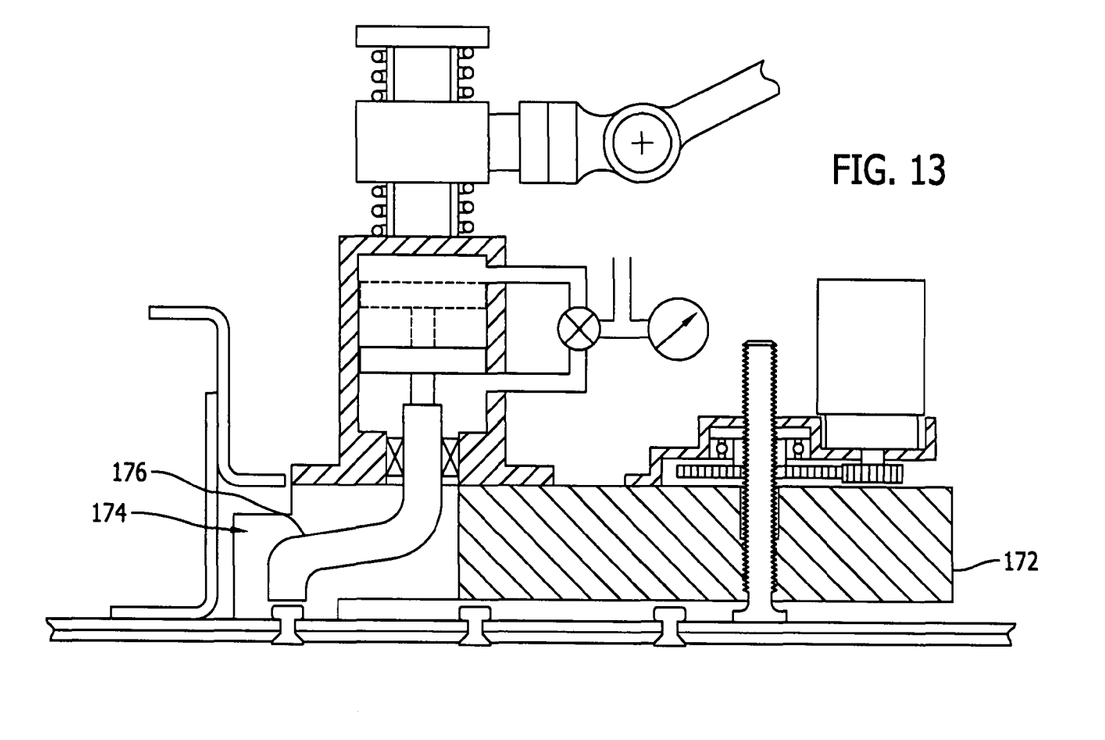
FIG. 13 is a side elevation view partially in section, illustrating an advantageous embodiment of a rivet forming integral tool of the invention similar to that of FIG. 2.
Figure 14:
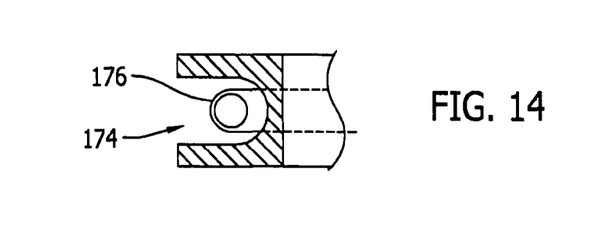
FIG. 14 is a partial plan view of a portion of the base shown in FIG. 13.

FIG. 13 is a side elevation view partially in section of a modified version of the rivet forming integral tool of FIG. 9. In FIG. 13 the base 172 of the tool is provided with a U-shaped opening 174 and the tool includes a bending bucking bar 176. FIG. 14 is a plan view of a portion of the base 172 and the bending bucking bar 176. The U-shaped opening 174 in the base 172 and the bending bucking bar 176 enable the tool to access rivets that are in difficult to assess locations.

As various modifications could be made in the constructions of the apparatus herein described and illustrated and their methods of use without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed:

1. A method of manufacturing a structure comprising:
   maintaining a plurality of different tooling components that are each associated with a different type of fastener, each tooling component of the plurality of different tooling components comprising a magnetically attractive base with front and rear surfaces, the base having a passageway through the base and through the front and rear surfaces where the passageway is configured for a predetermined assembly operation, each tooling component having a spacing protrusion, the spacing protrusion projecting a length from the base front surface to an engagement surface of the spacing protrusion, and each tooling component of the plurality of tooling components being attachable to a robotic assembly;
   determining a single assembly operation to be performed on the structure;
   determining a tooling component from the plurality of different tooling components that is operable to perform the assembly operation;
   attaching the tooling component to the robotic assembly;
   positioning a fastener associated with the tooling component in a hole in the structure;
   activating the robotic assembly to position the tooling component against one side of the structure aligning the passageway through the base with the fastener positioned in the hole in the structure and engaging the spacing protrusion engagement surface against the one side of the structure spacing the base front surface a clearance dimension from the one side of the structure that is larger than a length an installed fastener projects from the one side of the structure, thereby enabling the base front surface to pass over a previously installed fastener when moving the tooling component to a next fastener location; and,
   activating an electromagnet positioned on a second side of the structure, opposite the first side to attract the magnetic base toward the electromagnet and thereby clamp the magnetic base of the tooling component and the electromagnet to opposite sides of the structure.

2. The method of claim 1, further comprising:
   activating the tooling component to perform the assembly operation on the structure.

3. The method of claim 2, further comprising:
   the assembly operation involving securing a rivet fastener to the structure by activating the tooling component.

4. The method of claim 2, further comprising:
   the assembly operation involving securing a type of fastener comprising a threaded pin and a breakaway threaded collar which breaks off at a designed pre-load to the structure by activating the tooling component.

5. The method of claim 2, further comprising:
   the assembly operation involving securing a lock bolt fastener to the structure by activating the tooling component.

6. The method of claim 2, further comprising:
   deactivating the electromagnet; and,
   activating the robotic assembly to move the tooling component and the electromagnet to a further location of the structure.

7. The method of claim 6, further comprising:
   again activating the electromagnet to attract the tooling component base to the electromagnet and clamp the structure between the tooling component base and the electromagnet.

8. A method of connecting a first piece of a structure to an adjacent second piece of the structure, the method comprising:
   maintaining a plurality of different fasteners;
   maintaining a plurality of different tools, each tool of the plurality of different tools being associated with a particular fastener of the plurality of different fasteners and being operable to fasten the particular fastener associated with the tool to secure together the first piece of the structure and the second piece of the structure employing the particular fastener, each tool having a base of a magnetic material with the base having front and rear surfaces and an opening through the base and through the front and rear surfaces that accommodates a portion of the tool to pass through the opening and engage the fastener associated with the tool, each tool having a spacing protrusion, the spacing protrusion projecting a length from the base front surface to an engagement surface of the spacing protrusion;
   determining a fastening operation to be performed on the first and second pieces of the structure;
   determining a fastener of the plurality of different fasteners for performing the fastening operation;
   determining a tool of the plurality of different tools that is associated with the fastener;
   maintaining a robotic system that is selectively attachable to each tool of the plurality of different tools and is operable to move the tool to a plurality of predetermined locations relative to the first and second pieces of the structure;
   securing the robotic system to the tool;
   positioning the fastener associated with the tool in a hole through the first and second pieces of the structure;
   activating the robotic system to move the tool to a location on a first side of the first and second pieces of the structure where the opening through the base is aligned with the fastener positioned in the hole through the first and second pieces of the structure and engaging the spacing protrusion engagement surface against the first side of the first and second pieces of the structure spacing the base front surface a clearance dimension from the first side of the first and second pieces of the structure that is larger than a length an installed fastener projects from the first side of the first and second pieces of the structure, thereby enabling the base front surface to pass over a previously installed fastener when moving the tool to a next fastener location;

positioning an electromagnet on a second side of the first and second pieces of the structure, opposite the first side;

activating the electromagnet and attracting the base of the tool to the electromagnet and thereby clamping the first and second pieces of the structure between the base of the tool and the electromagnet;

operating the tool to attach the fastener associated with the tool between the first and second pieces of the structure.

9. The method of claim 8, further comprising:
the opening through the base of each tool of the plurality of different tools being a single opening through the base.

10. The method of claim 8, further comprising:
deactivating the electromagnet; and,
activating the robotic system to move the tool to a further location on the first side of the first and second pieces of the structure;
moving the electromagnet to the further location of the second side of the first and second pieces of the structure opposite the tool;
activating the electromagnet to attract the base of the tool to the electromagnet and thereby clamp the first and second pieces of the structure at the further location.

11. The method of claim 8, further comprising:
redetermining the fastening operation to be performed on the first and second pieces of the structure.

12. The method of claim 8, further comprising:
the fastening operation to be performed on the first and second pieces of the structure being a riveting operation.

13. The method of claim 8, further comprising:
the fastening operation to be performed on the first and second pieces of the structure employing a type of fastener comprising a threaded pin and a breakaway threaded collar which breaks off at a designed pre-load.

* * * * *